United States Patent [19]

Walker et al.

[11] 4,166,663

[45] Sep. 4, 1979

[54] MULTI-CONTACT CONNECTORS WITH INDIVIDUAL RESILIENT CONTACT INSERTS

[75] Inventors: Garland H. Walker; Ernest M. Hall, Jr., both of Houston, Tex.

[73] Assignee: Western Geophysical Co. of America, Houston, Tex.

[21] Appl. No.: 900,846

[22] Filed: Apr. 28, 1978

Related U.S. Application Data

[63] Continuation of Ser. No. 740,913, Nov. 11, 1976, abandoned, Continuation-in-part of Ser. No. 606,903, Aug. 22, 1975, abandoned.

[51] Int. Cl.² .................... H01R 13/42; H01R 23/20
[52] U.S. Cl. .................... 339/49 B; 339/59 M; 339/61 M
[58] Field of Search .................... 339/47 R, 48, 49 R, 339/49 B, 59 R, 59 M, 61 R, 61 M, 63 R, 63 M, 218 R, 218 M, 176 M

[56] References Cited

U.S. PATENT DOCUMENTS

| | | | |
|---|---|---|---|
| Re. 23,547 | 9/1952 | Fox | 339/47 R |
| 393,757 | 12/1888 | Griscom | 339/49 B |
| 2,938,190 | 5/1960 | Krehbiel | 339/49 R |
| 3,080,544 | 3/1963 | Stott et al. | 339/48 |
| 3,148,929 | 9/1964 | Gordon | 339/49 R |
| 3,181,101 | 4/1965 | Fox | 339/49 R |
| 3,181,104 | 4/1965 | Oxley | 339/59 M |
| 3,440,596 | 4/1969 | Frompovicz | 339/206 |
| 3,576,516 | 4/1971 | Mull | 339/91 R |

*Primary Examiner*—Neil Abrams
*Attorney, Agent, or Firm*—William A. Knox

[57] ABSTRACT

The electric multi-contact connector consists of twin half-housings. Each half-housing carries a plurality of contact holders independently mounted in spaced-apart relationship on a multi-bore base. The prong-end of each contact is resiliently supported by its holder and makes a water-tight joint therewith. When the two half-housings are moved into latching engagement, each pair of mating prong-ends of the opposite connector half-housings inosculate. Each prong-end is preferably serrated to improve the conductivity between each mating pair of prong-ends under adverse operating conditions.

5 Claims, 20 Drawing Figures

MULTI-CONTACT CONNECTORS WITH INDIVIDUAL RESILIENT CONTACT INSERTS

REFERENCE TO RELATED APPLICATIONS

This application is a continuation of application Ser. No. 740,913, filed Nov. 11, 1976 and now abandoned which is, in turn, a continuation-in-part of application Ser. No. 606,903, filed Aug. 22, 1975, now abandoned.

BACKGROUND OF THE INVENTION

1. Field of the Invention (a) This invention generally relates to multi-contact connectors.

(b) More specifically, the invention relates to multi-contact spread connectors for seismic cables.

2. Description of the Prior Art

Multi-contact connectors are widely used in various technical fields. While this invention is not limited to the seismic prospecting field, it will be described as having particular utility thereto. In the seismic art, multi-contact connectors are known as "spread" connectors which are adapted for interconnecting the electric conductors of geophone spread cables. Each electric conductor carries the signal from one or more geophones; the signal a seismic trace on a suitable recorder. A faulty pair of contacts in any one of the spread connectors will cause the complete loss of the signal and hence loss of the corresponding seismic trace.

Since geophysical work is carried out in adverse environments, the spread connector typically becomes subjected to dirt, sand, water, mud, etc. Even though the contacts are usually mounted in waterproof housings, the contacts unavoidably become dirty requiring frequent cleaning thereof.

Most commercially available spread connectors employ pin and socket terminals although because of their convex surfaces, the pins are relatively easy to clean, dirt deposited inside the sockets is rather difficult to dislodge. Normally, mechanical contact is established between the outer wall of the pin and the inner wall of the socket, with the pin exerting radial pressure against the socket in a plane transverse to the direction of the axial force producing the engagement therebetween. This constitutes a very inefficient mode of force transfer. Thus, even when an adequate axial force is applied onto the pin, there can result an inadequate mechanical pressure contact between the pin and the socket. A poor pressure contact between a pin and its socket may cause undesirable attenuation of the signal carried by the electric conductor connected thereto, or even a complete loss of signal.

The design of conventional pin-and-socket plugs for use in spread connectors requires that their contacts be precision manufactured and accurately aligned, both in the vertical and horizontal directions relative to the plug's end face. Such precision machining and assembly makes the cost of manufacturing conventional spread connectors relatively high. When a conventional spread connector requires servicing, either because its contacts are dirty or because some of its contacts break or become misaligned, such service can frequently not be accomplished in the field. As a result, an expensive spread connector is likely to become discarded just because of the inability or difficulty of servicing it in the field.

Other problems associated with known spread connectors are caused by their geometric configurations which make them objectionable for use with seismic spread cables. These problems are aggravated by the fact that seismic field crews are frequently composed of relatively inexperienced personnel, who have difficulty locating a problem associated with a multi-contact connector and making the required field repairs thereto.

Some of the above-mentioned problems have been solved by the invention described in U.S. Pat. No. 4,045,107. Although the above patent discloses an improved two-plug connector in respects of cost of manufacturing, ease of servicing, and reliability in operation under very adverse field conditions, the connector is not easily field repairable.

SUMMARY OF THE INVENTION

The multi-contact connector of this invention is particularly adapted for seismic use in coupling geophone spread cables. The connector, constructed in two identical half-housings is characterized, in general, by individual resilient rectangular contact holders which are independently and removably mounted in a base having corresponding rectangular bores. The rectangular contact holders have long and short axes. Blade-shaped contacts are embedded in the contact holders. The contact holders and the embedded contacts are divided into two groups, the long axis of one group being perpendicular to the long axis of the other group. All contacts of the connector are unbiased, i.e., they are preferably neither male nor female but are hemaphroditic. Each contact has a blade-like prong-end whose exposed convex surface is easy to clean. The inter-contact pressure between two connector half-housings is exerted in the same direction as the force required to move the opposite halves of the connector into mating engagement. Each pair of engaged prong-ends establishes a self-cleaning mechanical pressure contact which is continuously maintained by the connector's latching means which secures the connector half-housings to each other.

Each contact prong-end is resiliently supported by its elastic contact holder and in one embodiment has a rectangular contact surface with a length-to-width ratio greater than one, and preferably between five and ten. The contact holders are mounted in their respective bores on the base, so that the mating prong-ends from opposite connector half-housings will intersect substantially at right angles to each other.

In a preferred embodiment, the rectangular contact surface of each prong-end is serrated to improve the electrical conductivity, under adverse operating conditions, between the engaged prong ends.

BRIEF DESCRIPTION OF THE DRAWINGS

FIGS. 5 and 6 are views on lines 5—5 and 6—6, respectively, in FIG. 3;

DETAILED DESCRIPTION OF PREFERRED EMBODIMENTS

Figure 1:
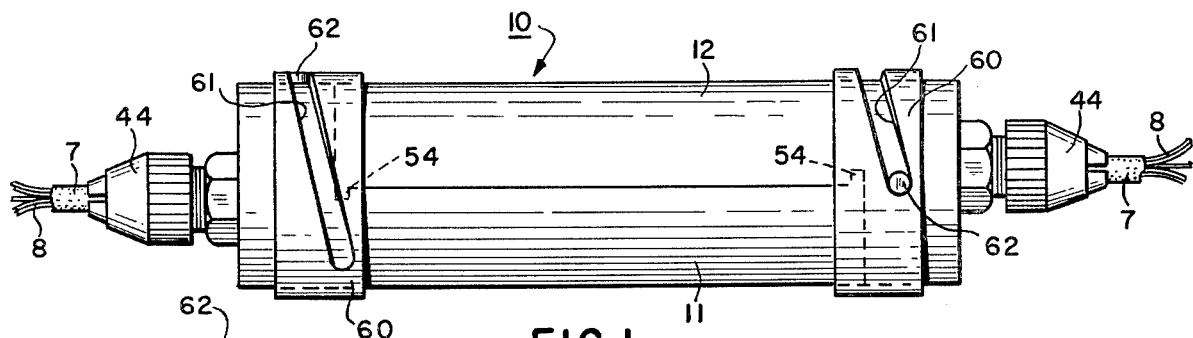
FIG. 1 is a view in elevation of the spread connector in accordance with this invention.
Figure 2:
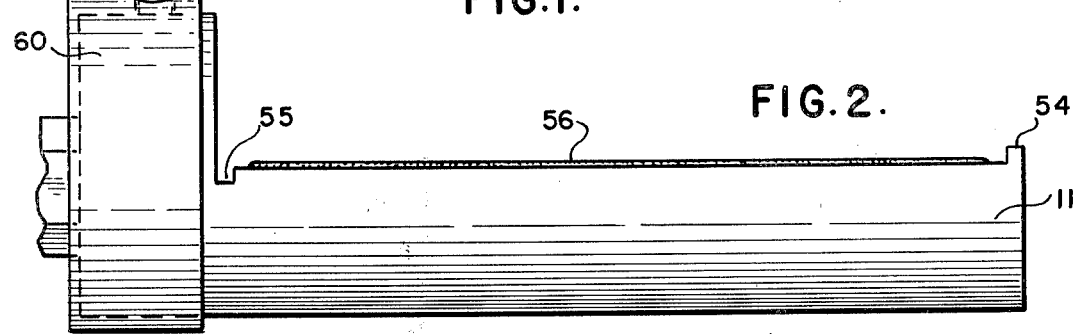
FIG. 2 is a view in elevation of one plug of the spread connector shown in FIG. 1.

In the drawings, for ease of illustration, the same reference characters will be used to designate the same or similar parts. The two part connector is generally designated as 10. The connector is adapted for interconnecting a pair of geophone-spread, multi-conductor cables 7, each having insulated conductors 8. Connector 10 comprises twin halves 11, 12. Each half has a rigid base 16, made from a hard material, which could be metal or plastic, although plastic is preferred for ease of fabrication. Two groups of transverse rectangular bores 13, 14 are provided in each base. Each bore has a width smaller than its length. The long axis of bores 13 and the long axes of bores 14 are perpendicular to each other.

A contact holder 30 is removably mounted in each bore. Each holder resiliently supports its sole contact 23. The preferred embodiment of holder 30 consists of a block of elastic resilient material, such as rubber or the like, which encircles embedded contact blade 23.

Figure 20:
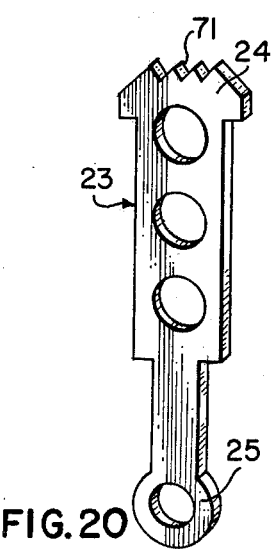
FIG. 20 is a perspective view of a preferred embodiment of a prong-end with grooves thereon.
Figure 12:
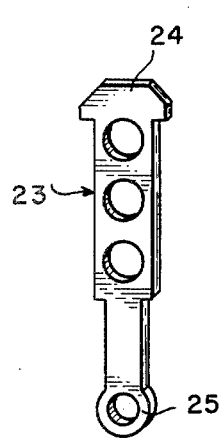
FIG. 12 is a perspective view of one embodiment of a contact.
Figure 13:
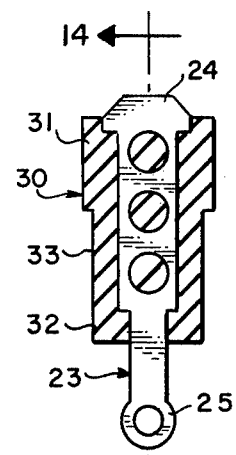
FIG. 13 is a sectional view of a contact holder showing the contact embedded therein.

Each connector contact 23 is a conductive metal blade and can assume various configurations. In the embodiment illustrated in FIG. 12, the contact 23 has a rectangular prong-end 24, and in the preferred embodiment as shown in FIG. 20, each prong-end is undulate or serrated as will subsesquently be described.

Figures 14, 15:
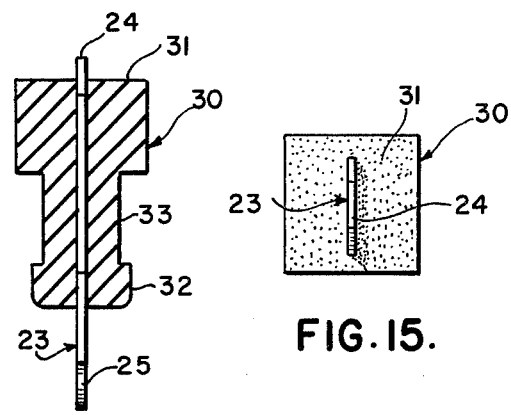
FIG. 14 is a sectional view on line 14—14 in FIG. 13.
FIG. 15 is a top view of the contact holder shown in FIG. 14.

Holder 30 has a square head 31 (FIG. 14), a smaller rectangular leg 32, each one of heads 31, and legs 32 having a cross-sectional area greater than the area of the opening of its bore 13 or 14, and an intermediate section 33, which snugly fits inside the bore. Each holder 30 is forcibly inserted into its bore by first pushing in its leg 32 which squeezes through the bore and emerges beneath base 16, with the enlarged head 32 remaining above the base, to form a watertight seal. The contacts' terminal ends 25 project below the base 16 for connection to conductors 8, as by soldering.

Each prong-end 24 of each contact 23 projects above the supporting head 31 of resilient holder 30. In the embodiment shown in FIGS. 12–19, each prong-end has a rectangular blade-like top surface, the width dimension w of which is desirably considerably smaller than its length dimension l, so that the ratio l/w is greater than one, and in the preferred embodiment is between five and ten. Collectively, contact 23, embedded in contact holder 30, constitutes an individual resilient contact insert.

These rectangular top surfaces, from opposite connector half-housings, intersect and inosculate upon mating engagement at an angle A, preferably 90°. With a length-to-width ratio on the order of five to ten, the prong-ends 24 will practically always engage when the two connector half-housings are mated together. Hence, the width of one contact can be positioned over any portion of the length of the oppositely engaged contact, and still maintain mechanical and electrical continuity therebetween. Also, the machining and assembly of the connector of this invention can accept more liberal tolerances and, therefore, the connectors can be manufactured at a substantial reduction in cost.

Figure 16:
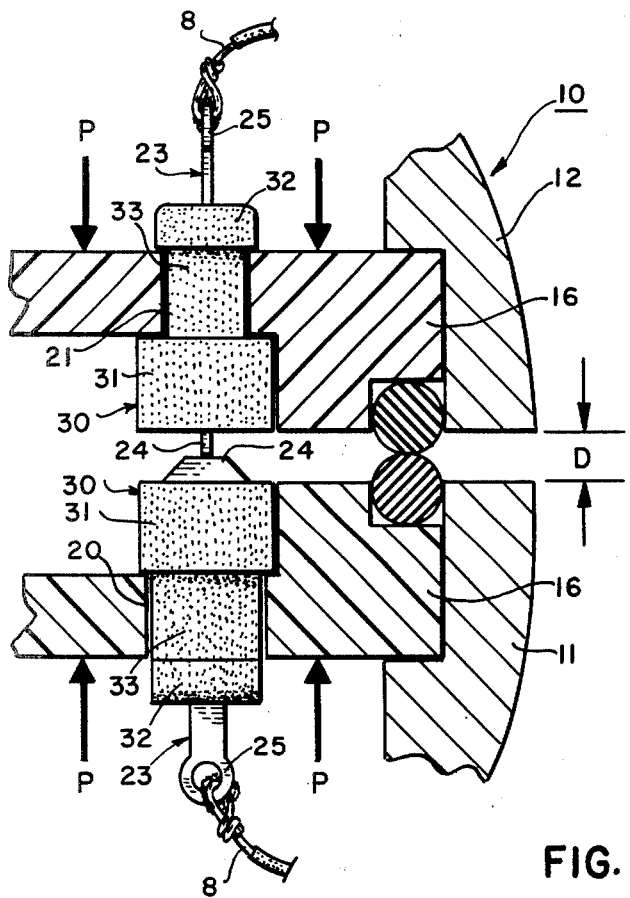
FIG. 16 is an enlarged, partial, sectional view of a portion of the connector showing a pair of mating contacts.

Each prong-end 24 can move slightly inwardly (FIGS. 18, 19) in a vertical direction in response to an axial load F which is resisted by a nearly equal counter force F' produced by the holder's resilient head 31. Thus, if and when a particular prong-end 24 is not perfectly aligned, such misalignment will be compensated for by its resilient holder 30, without affecting the pressure contacts between the prong-ends 24 of adjacent holders 30 mounted on base 16. Since the exposed surfaces of the prong-ends are convex, in the form of a blunt knife blade they are easy to clean. Moreover, when the two connector halves 11, 12 are moved toward each other for mating engagement and the connector 10 becomes latched, as will be subsequently described, there is exerted a continuous latching pressure P (FIGS. 16, 19) which serves to break away dust or other foreign matter deposited on and between the prong-ends 24 FIG. 16 shows that the contacts from opposite half-housings inosculate in hermaphroditic fashion when the half-housings are engaged.

Under very severe environmental conditions, the latching pressure P may be insufficient to break away the film of dust lodged between the prong-ends 24. Therefore, in another embodiment (FIG. 20), each rectangular surface of each prong-end 24 is serrated with V-shaped grooves 71. It was unexpectedly found that these grooves 71 ensure electric conductivity between each pair of mating contacts 23, even under the most adverse operative conditions, as required.

Figure 10:
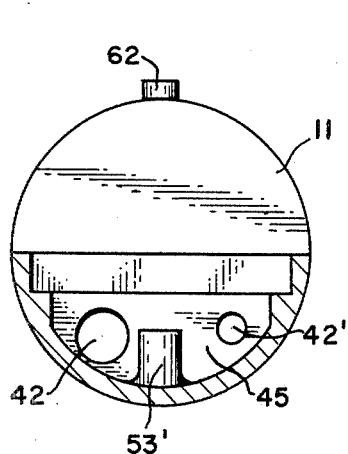
FIGS. 10 and 11 are views on lines 10—10 and 11—11 on FIG. 8, respectively.
Figure 11:
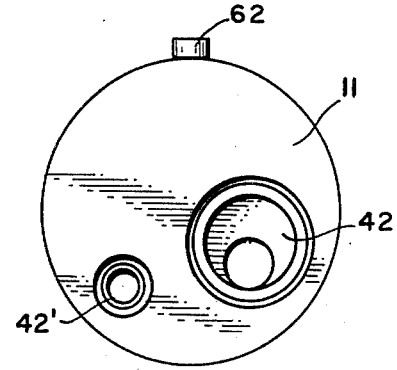

Each cable 7 enters the semi-cylindrical housing of a half-housing through an opening 42 (FIG. 7) and the cable is secured to the housing by a conventional split-sleeve chuck 44 (FIG. 1). The electric conductors 8 and the contacts' terminal ends 25 (FIG. 6) are lodged inside a channel 45 in the connector housing. A "takeout" cable (not shown) can be provided through another opening 42' (FIGS. 10, 11,) as is typical with spread connectors.

Figure 4:
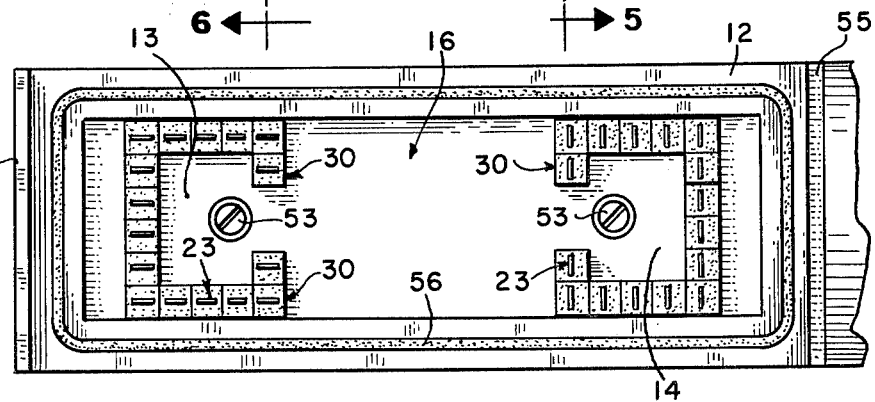
Figure 5:
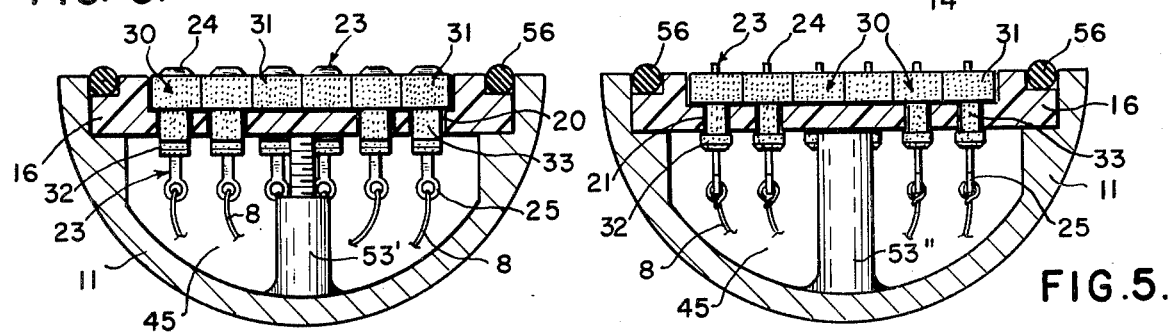
Figure 7:
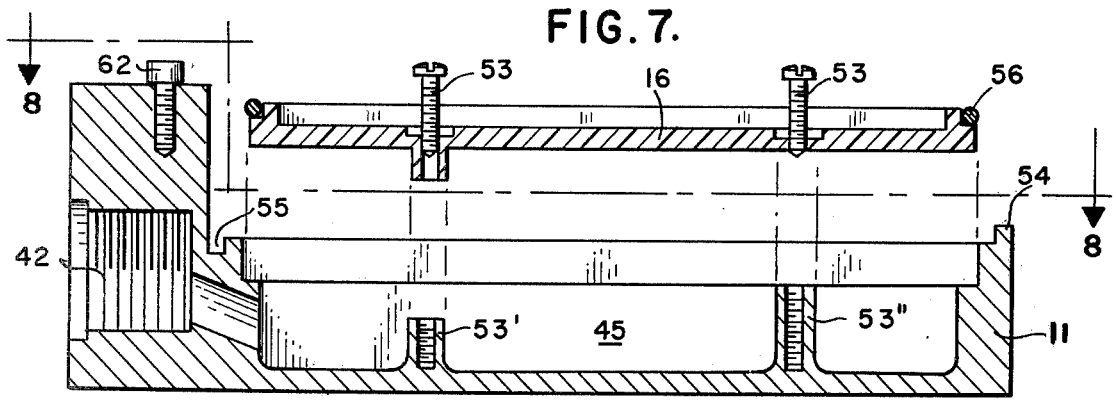
FIG. 7 is a longitudinal, sectional and exploded view of the plug without the contact holders.
Figure 8:
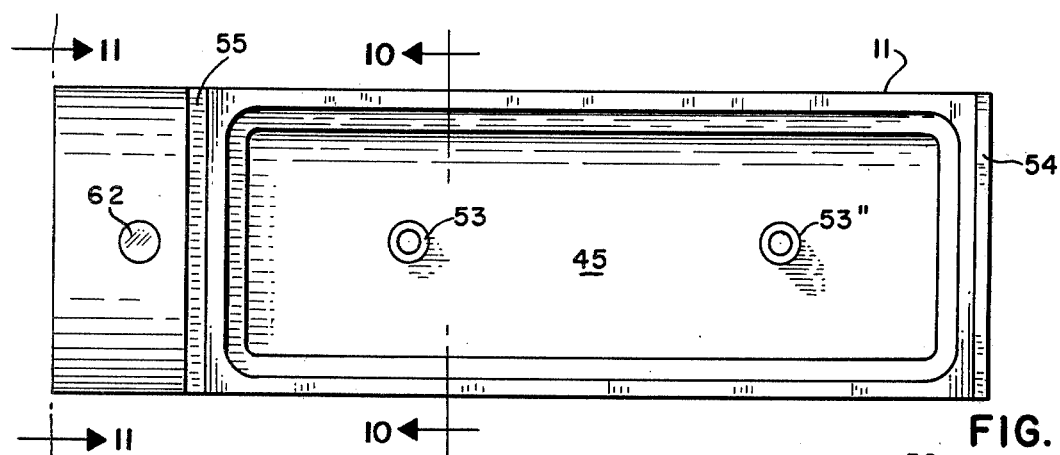
FIG. 8 is a plan view of a plug's housing shown in FIG. 7 without the base.
Figure 9:
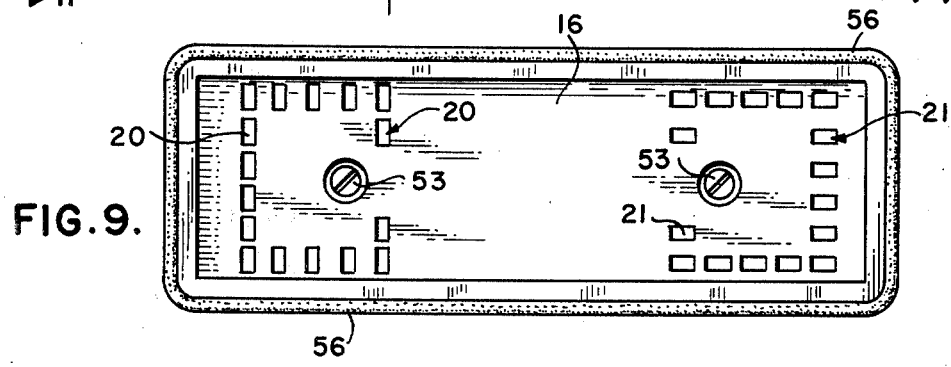
FIG. 9 is a plan view of the base shown in FIG. 7.

Cavity 45 is adapted to accept base 16 therein which is secured thereto by screws 53 (FIG. 4). Cavity 45 has a length-to-width ratio greater than one and preferably between three and five. It will be noted that base 16 will be accepted in cavity 45 in only one direction on account of the polarized screw sockets 53', 53" (FIG. 7).

An outwardly-extending shoulder 54 of one half-housing is adapted to be received by a mating channel 55 in the opposite half-housing. Each base 16 is provided with a peripheral O-ring 56 which seals off the space occupied by the prong-ends 24 when the two housings 11, 12 are forcibly inter-engaged and the connector 10 is latched.

Figure 3:
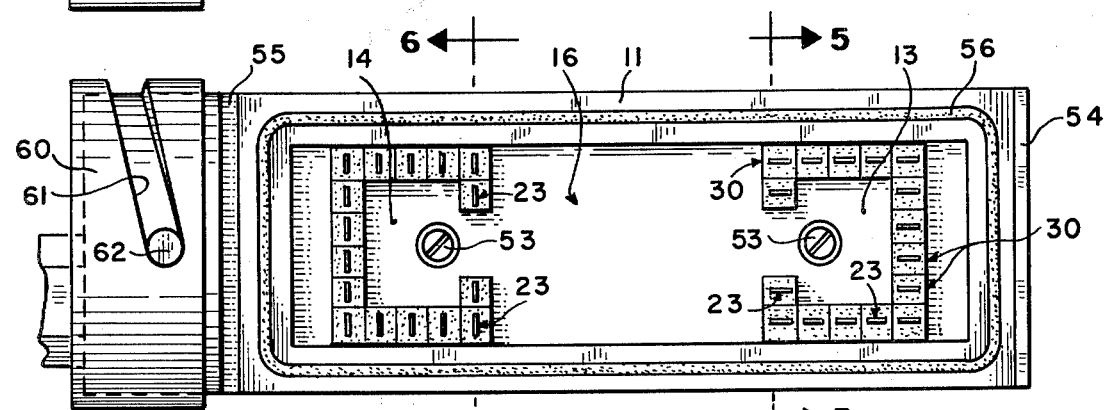
FIGS. 3 and 4 are plan views of the plugs forming the connector shown in FIG. 1.

The latching means comprise a rotatably-mounted sleeve 60 (FIG. 1) having an inclined recess 61 housing a radially-extending pin 62. Sleeve 60 can move in an axial direction by an amount determined by the length of the inclined slot 61. In FIG. 3 sleeve 60 is shown at its outermost position wherein it allows the interengagement of the semi-cylindrical half-housings. When the half-housings are forcibly moved toward each other by compressing O-rings 56, sleeves 60 can be made to slide toward each other to their innermost positions, so that connector 10 will become locked.

It will be appreciated by those skilled in the art that the construction of the cylindrical connector 10 lends itself for use with geophone spread cables in that the diameter of the connector is relatively small compared to its length dimension, and that the latching means employed do not appreciably spread out from the connector to become vulnerable to abuse, as is the case with many conventional multi-contact spread connectors.

Figure 17:
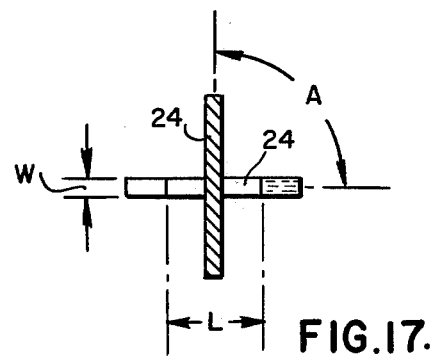
FIG. 17 illustrates the orientation of a pair of mating prong-ends.
Figure 18:
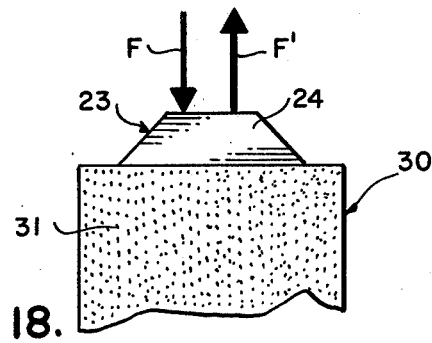
FIG. 18 illustrates the resilient support of an electric contact provided by the contact holder.
Figure 19:
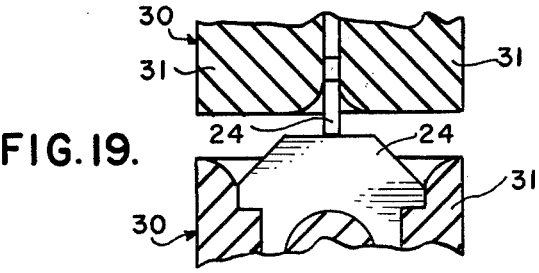
FIG. 19 illustrates the effect of the resilient support.

To allow each end of the geophone spread cable to become coupled to each other end, one half of the electric conductors 8 in each cable are connected to a first group of terminal-ends 25 whose holders 30 are mounted in bores 13, and the other half of the electric conductors are connected to another group of terminal-ends 25 whose holders are mounted in bores 14. The contacts 23 of the two groups lie in mutually perpendicular planes (FIG. 17). Upon full mating engagement of half-housings 11, 12, each pair of mating prong-ends will be engaged as best shown in FIG. 16.

While this invention has been illustrated with respect to specific embodiments thereof, it will be appreciated by those skilled in the art that modifications may be made therein without departing from the scope of the claims attached hereto.

In the event that a conductor such as 8 breaks away from a terminal end such as 25, it is not necessary to disassemble the entire connector half to make a repair. All that is required is to remove the individual contact insert, fish for the broken wire with a suitable probe, resolder the connection, and snap the contact insert back into place.

What is claimed is:

1. In a cable connector assembly for detachably connecting two multiple conductor cables, the improvement comprising:
   a pair of identical half-housings;
   a pair of bases, having a top portion and a bottom portion and defining a plurality of bores that extend between said top and bottom portions;
   each said base supported by each said half-housing which encloses the bottom portion of the corresponding base and exposes the top portion thereof;
   a plurality of contact inserts individually removably insertable from above said bases in each said bore, each said resilient contact insert including a contact blade sealingly embedded therein, each said contact blade having an elongate blunt knife-edged contact end face at one end that protrudes above said resilient contact insert, each said contact insert further including a shoulder for sealing a corresponding bore when said shoulder abuts the top portion of said base and for urging said contact blade axially away from said top portion; and
   means for coupling said pair of half housings together so that the contact end faces of the contact blades in the opposite half housings axially inosculate in hermaphroditic mating engagement.

2. The improved connector assembly as defined in claim 1 wherein:
   one half of said plurality of bores in each said base are directionally oriented at an angle to the other half of said bores so that when said resilient contact inserts are inserted into said bores the long dimension of half of said elongate contact blades are oriented at a desired angle with respect to the long dimension of the other half of said elongate contact blades.

3. The improved cable connector assembly as defined in claim 2 wherein:
   a portion of the contact blade embedded in each said resilient contact insert extends beneath said base to form a terminal lug; and
   one half of said multiple conductors of a one cable are coupled to the lugs of one sub-plurality of said resilient contact inserts and the other half of said multiple conductors are coupled to the lugs of the other sub-plurality of resilient contact inserts.

4. The improved cable connector assembly as defined in claim 1 wherein:
   any individual resilient contact insert in either one of said bases may be withdrawn for inspection by pulling its protruding contact blade from above, axially away from the top portion of said base and is reinsertable axially from above said base; and
   said shoulder constrains said withdrawn insert from being pushed through said bore beneath said base when said resilient contact insert in reinserted into its corresponding bore.

5. A cable connector assembly for detachably connecting together two lengths of a multiple-conductor cable, each half comprising:
   a rigid base having a top face and a bottom face, said base defining a first group and a second group of rectangular bores transversely extending through said base, the rectangular openings of the bores in the first group being substantially perpendicular to the rectangular openings of the bores in the second group;
   a contact holder mounted in each bore whereby the holder and associated contact are removable from the bore by pulling axially thereon away from the top face of said base causing the holder portion within the bore to pass through said top face, said contact holder being made of a flexible body of sufficient resiliency to tend to reassume its original form after deformation;
   a contact element embedded in each flexible contact holder body transversely to the upper surface thereof, whereby said body makes a watertight joint with the contact element, one end of each contact element forming an elongated planar-shaped prong-end which projects forwardly of, and is resiliently supported by, said body so as to urge the prong-end axially away from said body, and the other end of each contact element forming a contact terminal projecting rearwardly of said body and below the bottom face of said base and being adapted for connection to a cable conductor;
   one-half of the conductors in each cable being connected to the terminals whose contact holders are mounted in said first group of bores, and the other half of the conductors in each cable being connected to the terminals whose contact holders are mounted in said second group of bores; and
   a protective housing protecting said base, the housing of one connector half being adapted to form a mechanical attachment with the protective housing of the other connector half to thereby effectuate a mechanical and electrical engagement between the forward edges of the respective prong-ends of both connector halves at a substantially 90 degree angle between the transverse outlines of the planar-shaped prong-ends.

* * * * *